United States Patent [19]
Fukuda et al.

[11] Patent Number: 5,809,310
[45] Date of Patent: *Sep. 15, 1998

[54] TRACE INPUT DEVICE WITH REMAINING POWER INFORMING FUNCTION AND METHOD THEREFOR

[75] Inventors: Ryoji Fukuda, Kawasaki; Takashi Harada, Yamato, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 651,736

[22] Filed: May 22, 1996

[30] Foreign Application Priority Data

May 23, 1995 [JP] Japan .................................... 7-148089

[51] Int. Cl.$^6$ ................. G06F 1/26; H04N 1/50
[52] U.S. Cl. ................. 395/750.01; 395/750.02; 320/43; 345/11
[58] Field of Search ............... 395/750, 750.01, 395/750.02; 364/707; 320/43; 348/743, 739; 345/3, 11

[56] References Cited

U.S. PATENT DOCUMENTS

| | | | |
|---|---|---|---|
| 3,986,202 | 10/1976 | Granger | 386/44 |
| 4,984,185 | 1/1991 | Saito | 364/707 |
| 5,341,503 | 8/1994 | Gladstein et al. | 395/750 |
| 5,479,183 | 12/1995 | Fujimoto | 345/3 |
| 5,493,685 | 2/1996 | Zenda | 395/750 |
| 5,523,802 | 6/1996 | Sugihara et al. | 348/743 |

*Primary Examiner*—Gopal C. Ray
*Attorney, Agent, or Firm*—Fitzpatrick, Cella, Harper & Scinto

[57] ABSTRACT

A trace input device with function of informing the remaining power of the power supply is described. The device is provided with a remaining power measuring device, and the display form, such as the color or the width, of the entered trace is changed according to the measured remaining power, so that the remaining power can be securely recognized without particular display device.

17 Claims, 4 Drawing Sheets

TRACE INPUT DEVICE WITH REMAINING POWER INFORMING FUNCTION AND METHOD THEREFOR

BACKGROUND OF THE INVENTION

1. Field of the Invention

The present invention relates to a trace input device used as a portable information terminal for entering a trace and a method therefor, and more particularly to a trace input device driven with a battery and having a function of informing the remaining power of the battery.

2. Related Background Art

There is already known an electronic equipment including a trace input/output device, with a function of informing the remaining electric power, provided with a trace input unit for entering the trace information, a trace display unit for displaying the trace entered by the trace input unit, a trace display control unit for controlling the trace display unit, a power supply, and a remaining power measuring unit for measuring the remaining power of the power supply.

In such conventional trace input/output device with the remaining power informing function, a lowered remaining power is informed to the user by an alarm such as a buzzer sound, a color of the light-emitting diode, or a pop-up window on the display frame.

On the other hand, certain recent portable electronic equipment are provided with a trace input/output device with plural power supplies (for example rechargeable ones), such as that for display, that for a clock, that for memory back-up and that for disk driving.

However, among the above-mentioned prior technologies, the buzzer sound is not adequate as the alarm in a quiet situation where the sound is not permitted, or in a situation where the noises are very high.

Also the alarm by the light-emitting diode is not effective because it involves the addition of an electronic circuit and an increase in the power consumption.

Also the alarm by the pop-up window interrupts the input operation.

Also in the electronic equipment provided with plural power supplies, there has not been available the function of specifying the power supply of which remaining power has become low.

SUMMARY OF THE INVENTION

An object of the present invention is to provide a trace input device with remaining power informing function, enabling secure recognition of the remaining power without particular display means, and a method therefor.

Another object of the present invention is to provide a trace input device with remaining power informing function, enabling to identify the power supply of low remaining power, among plural power supplies.

The foregoing objects can be attained, according to the present invention, by a trace input device with remaining power informing function provided with trace input means for entering trace information, trace display means for displaying the trace entered by the trace input means, trace display control means for controlling the trace display means, a power supply, and remaining power measuring means for measuring the remaining power of the power supply, wherein the trace display control means is adapted to control the display of the trace, displayed by the trace display means, based on the output of the remaining power measuring means.

Also the present invention is featured by a fact that the trace display control means is adapted to control at least one of the display attributes, including the shape, color, flashing and width of the trace, displayed by the trace display means.

The present invention is further featured by a fact that the trace display control means is adapted to control the display speed of the trace at the display by the trace display means.

The present invention is further featured by a fact that there are employed plural power supplies, that the display attributes to be controlled are determined in advance for each power supply and that the trace display control means is adapted to control the display attributes for each power supply, based on the output of the remaining power measuring means.

DETAILED DESCRIPTION OF THE PREFERRED EMBODIMENTS

Now the present invention will be clarified by preferred embodiments thereof shown in the attached drawings.

[First Embodiment]

Figure 1:
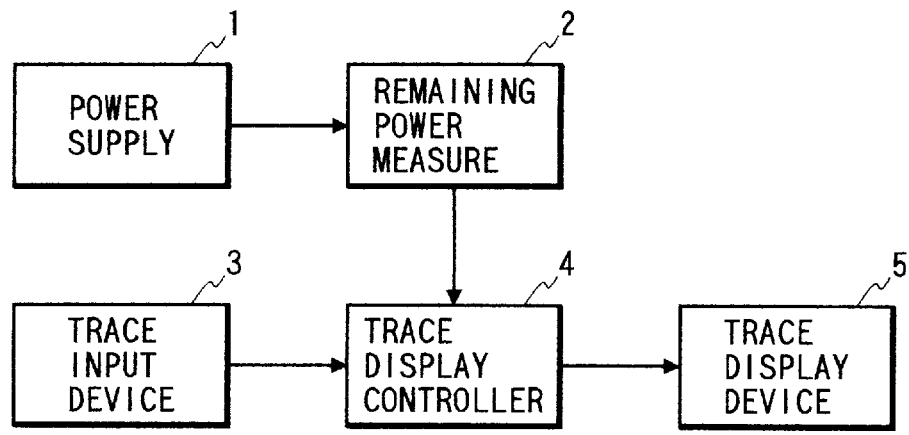
FIG. 1 is a block diagram showing the schematic configuration of the trace input/output device with remaining power informing function, constituting a first embodiment of the present invention.

FIG. 1 is a block diagram showing the schematic configuration of the trace input/output device with remaining power informing function, constituting a first embodiment of the present invention.

As shown in FIG. 1, the trace input/output device of this embodiment is composed of a power supply 1, a remaining power measuring device 2, a trace input unit 3, a trace display control device 4, and a trace display device 5.

The power supply 1 is composed of a rechargeable battery such as a nickel-cadmium battery or a nickel-hydrogen battery and supplies the electric power to the units of the trace input/output device. The remaining power measuring device 2 is composed of a known one-chip exclusive device and measures the remaining power of the power supply 1. The remaining power measurement by the device 2 may be conducted in a known technology, such as by voltage measurement at a given interval and estimation of the remaining power from the integrated voltage drop, or by current measurement and estimation of the remaining power from the comparison with the experimentally measured value.

The trace input unit 3 is composed for example of an electromagnetic digitizer attached to a liquid crystal display device, wherein the trace information for example of a character or a pattern can be entered by contacting the display unit of the liquid crystal display device with a trace input pen. The trace display control device 4 is composed of a microcomputer including a CPU (central processing unit), a ROM (read-only memory) storing a trace display control program etc., a RAM (random access memory) etc., and controls the display by the trace display device 5. The trace display device 5 is composed of a liquid crystal display device and displays various information including the trace information mentioned above.

Figure 2:
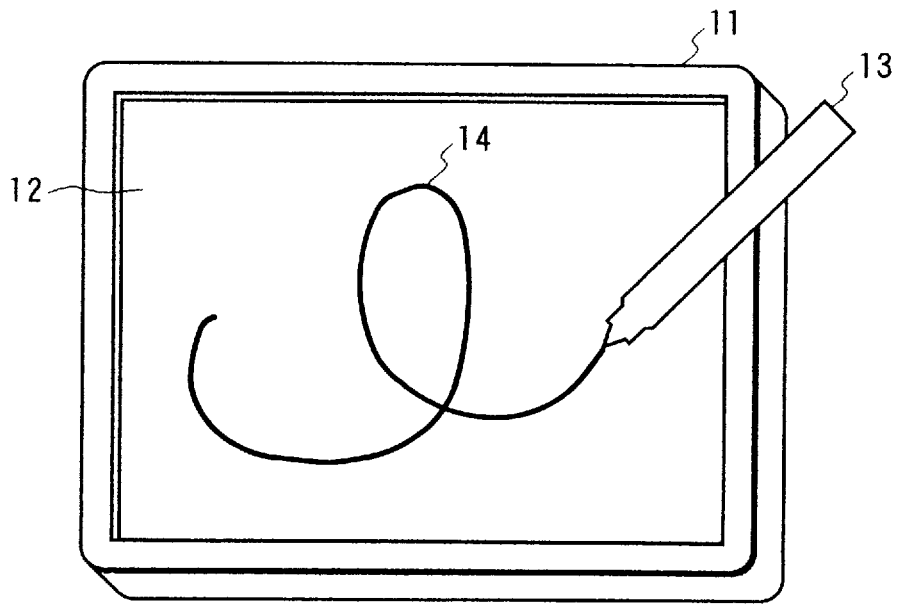
FIG. 2 is a view showing an example of display on a trace display unit in said device.
Figure 3:
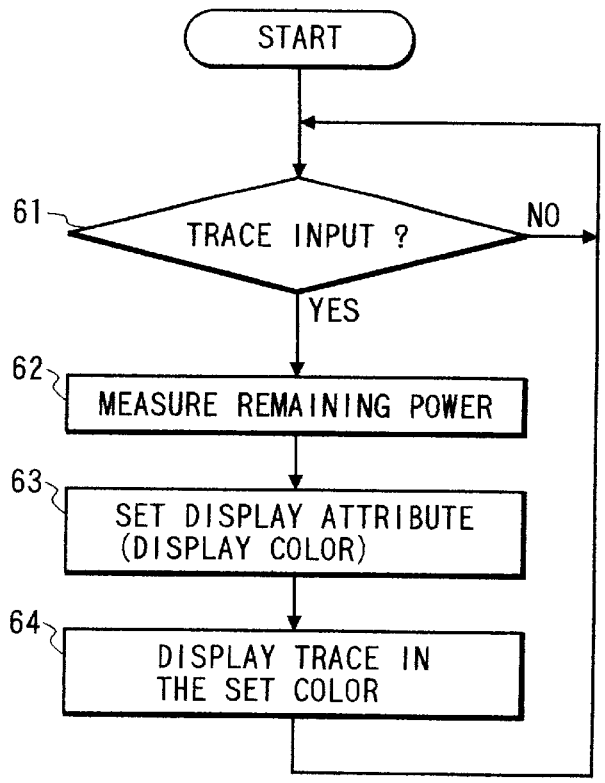
FIG. 3 is a flow chart showing a control program to be executed by a trace display control unit of said device.

Now reference is made to FIGS. 2 and 3 for explaining the function of the trace input/output device of the present embodiment.

FIG. 2 shows an example of the display in the display unit of the trace display device 5, wherein shown are a liquid crystal display device 11 with an electromagnetic digitizer for trace input; a display image area 12 of the liquid crystal display device 11; a trace input pen 13 constituting the trace input means 3; and a trace 14 displayed on the image area 12.

In the configuration shown in FIGS. 1 and 2, the trace display control device 4 displays the trace of a character or a pattern, entered by the user with the trace input pen 13, on the display image area 12 of the liquid crystal display device 11, with a varied color constituting a display attribute according to the remaining power of the power supply 1 measured by the remaining power measuring device 2. For example, if the power supply 1 still has an ample remaining power the trace 14 is displayed with black color, but, if the remaining power is limited, it is displayed with red color. Also there may be used a larger number of colors, such as black if the remaining power exceeds 80%, blue if the remaining power is within a range from 80 to 60%, and red if the remaining power is less than 60%. It is also possible to change the trace to a broken line or to change the width of the trace.

FIG. 3 is a flow chart showing a control program to be executed by the trace display control device 4.

At first a step 61 discriminates the presence of input of the trace information by the trace input unit 3, and, if absent, the step 61 is repeated until the trace information is entered. If the trace information is entered, a step 62 causes the remaining power measuring device 2 to measure the remaining power of he power supply 1.

Then a step 63 set the display color, as the display attribute of the trace, according to the remaining power of the power supply 1 measured in the step 62. A step 64 executes the display of the trace with the display color set in the step 63.

In the present embodiment, as explained in the foregoing, the display color constituting the display attribute of the trace is selected according to the remaining power of the power supply 1 measured by the remaining power measuring device 2, so that the user can securely recognize the lowered remaining capacity of the power supply 1.

[Second Embodiment]

Figure 4:
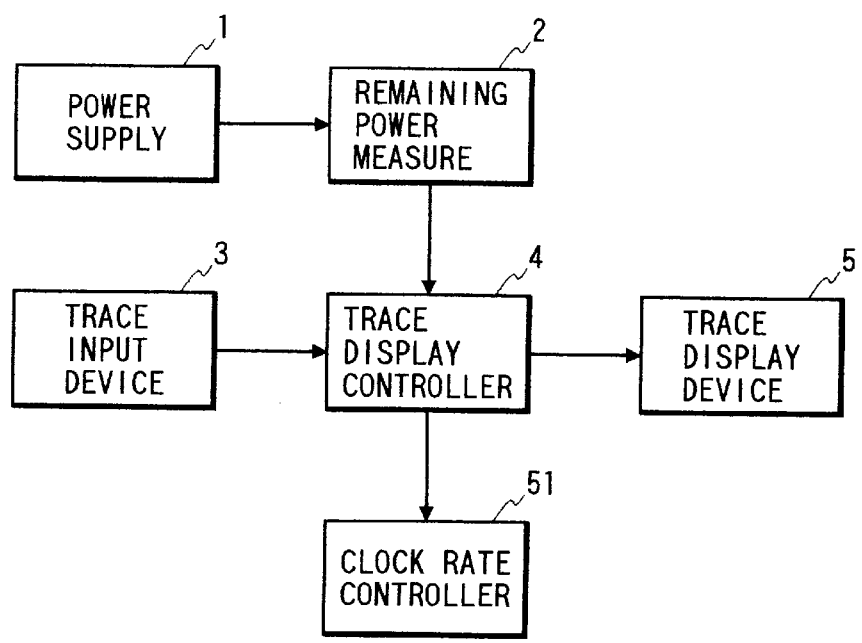
FIG. 4 is a block diagram showing the schematic configuration of the trace input/output device with remaining power informing function, constituting a second embodiment of the present invention.

Now a second embodiment of the present invention will be explained with reference to FIG. 4, which is a block diagram showing the schematic configuration of the trace input/output device with remaining power informing function, constituting a second embodiment of the present invention. This embodiment is different from the foregoing first embodiment only in the addition of a clock rate control device 51 and is identical to the first embodiment in other aspects, so that the components same as those in the first embodiment are represented by same numbers and will not be explained further.

The above-mentioned clock rate control device 51 sets the clock frequency of an unrepresented clock generator incorporated in the trace display control device 4, according to the remaining power of the power supply 1 measured by the remaining power measuring device 2. Thus the drawing speed of the trace by the trace display device 5 is varied according to the remaining power of the power supply 1.

The control program executed by the trace display control device 4 of the trace input/output device of the present embodiment is same as that shown in FIG. 3, except that the step 63 is changed to "clock frequency setting", and in such modified step, the trace display control device 4 selects the clock frequency lower if the remaining power of the power supply 1, measured by the remaining power measuring device 2, becomes low. Then a next step 64 so controls the trace display with a lowered drawing speed.

In the present embodiment, as explained in the foregoing, the trace display control device 4 sets the trace drawing speed by the trace display device 5 according to the remaining power of the power supply 1, so that, even when the trace display device 5 is composed of a monochromatic liquid crystal display, the user can securely recognize the lowered power state from the change in the trace drawing speed.

For informing the user of the lowered remaining power of the power supply 1, in case of the monochromatic liquid crystal display device, it is also conceivable to change the gradation of the displayed trace according to the remaining power. However, judgment with this method may be more difficult, in comparison with the change in the display color in the color display device.

As this embodiment informs the user of the lowered remaining power by a change in the trace drawing speed, the user can securely recognize the remaining power even with a monochromatic display device.

Also the method of this embodiment, varying the display speed, still allows the input of the trace even when the remaining power becomes low, so that certain saving operations (such as back-up to a hard disk) are made possible as the preparation for the charging of the power supply 1.

[Third Embodiment]

Now a third embodiment of the present invention will be explained with reference to FIGS. 5 and 6.

Figure 5:
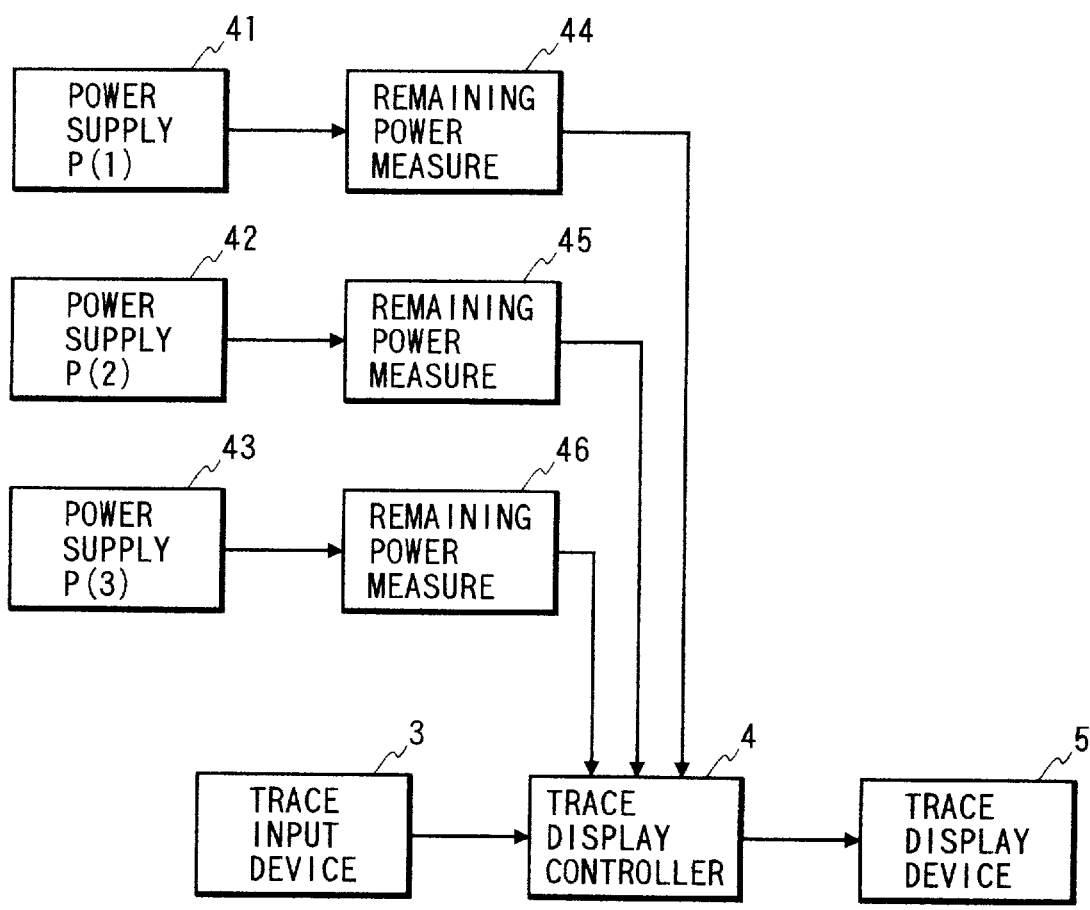
FIG. 5 is a block diagram showing the schematic configuration of the trace input/output device with remaining power informing function, constituting a third embodiment of the present invention.
Figure 6:
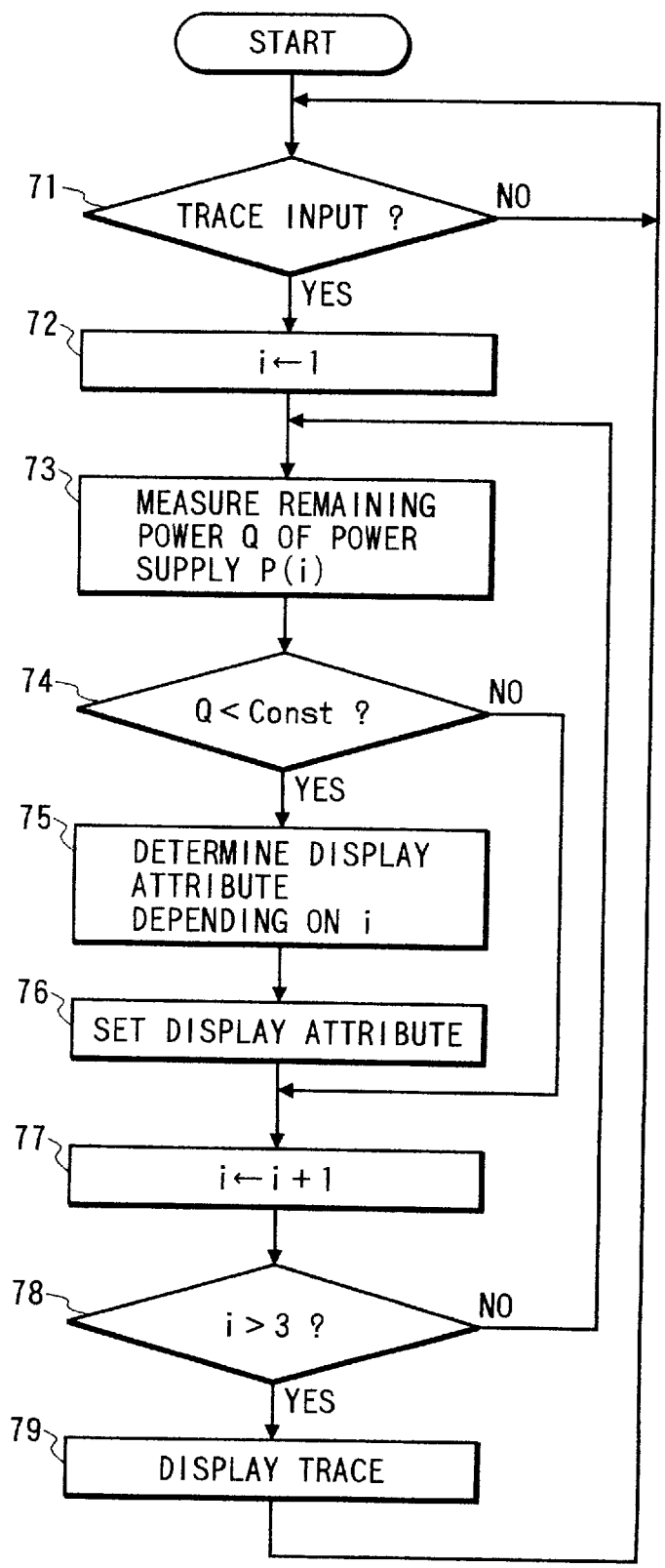
FIG. 6 is a flow chart showing a control program to be executed by a trace display control unit of said device.

FIG. 5 is a block diagram showing the schematic configuration of the trace input/output device with remaining power informing function, constituting a third embodiment of the present invention. As shown in FIG. 5, the device of the present embodiment is provided with plural power supplies P(i) (i=1, 2, 3 in the present embodiment) 41, 42, 43 which are respectively connected to remaining power measuring devices 44, 45, 46 whose results of measurement are supplied to the trace display control device 4.

In the following the function of the above-explained trace input/output device will be explained with reference to FIG. 6, which is a flow chart showing a control program to be executed by the trace display control device 4.

At first a step 71 discriminates the presence of input of trace information, and, if absent, the step 71 is repeated. A step 72 substitutes 1 in the variable i. A step 73 causes the remaining power measuring device 64 to measure the remaining power of the power supply P(i) and substitutes the result of measurement in a variable Q. A step 74 compares the variable Q with a predetermined constant Const, and, if the variable Q is smaller or larger, the sequence respectively proceeds to a step 75 or 77.

The step 75 determines the display attribute to be changed, according to the value of the variable i. For example, for i=1, the display attribute to be changed is selected as the display color as in the first embodiment, and, for i=2, the display attribute to be changed is selected as the trace line style (such as solid line and broken line), and, for i=3, the display attribute to be changed is selected as the display mode (such as normal display and flashing display).

Then a step 76 sets the display attribute, determined in the step 75 according to the variable i, according to the remaining power Q.

Then a step 77 increases the variable i by one. A step 78 discriminates whether the value of the variable i is larger than the number of the power supplies (3 in this embodiment) provided in the trace input/output device, and if the value is larger or smaller than sequence respectively proceeds to a step 79 or returns to the step 73.

The step 79 executes the trace display, according to the determination in the step 75 and the setting in the step 76.

In the present embodiment, in the equipment provided with plural power supplies (such as that for memory back-up, that for clock, that for hard disk driving etc.) for improving the efficiency of the power supply or for avoiding the interruption in the job, the remaining power measuring device are respectively provided and the display attributes of the trace are correlated with the respective power supplies and selected according to the remaining power of each power supply, so that the power supply with the lowered capacity can be specified among such plural power supplies for different purposes.

In the foregoing description, the number of the power supplies is assumed as three, but such number is not critical and there may added other power supplies and other remaining power measuring devices if required.

The present invention enables to securely recognize the remaining power without particular display means, as the trace display control means controls the display of the trace by the trace display means, according to the output of the remaining power measuring device which measures the remaining power of the power supply.

Also the remaining power can be securely recognized as the trace display control means controls at least one of the display attributes including the shape, color, flashing and width of the trace displayed by the trace display means.

Also the remaining power can be securely recognized without particular display means, even in case of monochromatic display, as the trace display control means is adapted to control the display speed of the trace by the trace display means.

Also the power supply with the lowered power can be specified among the plural power supplies, as the display attributes to be controlled are determined in advance respectively for the plural power supplies, and the trace display control means is adapted to control the display attribute corresponding to each power supply, according to the output of the remaining power measuring device.

What is claimed is:

1. A trace input device with a remaining power informing function, comprising:

a trace input device for entering trace information;

display means for displaying a trace based on the trace information entered by said trace input device;

power supply means for supplying electric power to said trace input device;

detection means for detecting a remaining power of said power supply means; and control means for changing, based on the remaining power detected by said detection means, the trace displayed on said display means between a first kind of trace and a second kind of trace;

wherein said first and second kinds of traces are different from each other.

2. A trace input device according to claim 1, wherein the first and second kinds of traces differing in color from each other.

3. A trace input device according to claim 1, further comprising clock generating means for generating clock signals of plural frequencies, wherein said control means controls said display means to display the trace with a clock signal generated by said clock generating means according to the remaining power detected by said detection means.

4. A trace input device according to claim 1, wherein said power supply means comprises a plurality of batteries, and the first and second kinds of traces are different from each other for each of said batteries.

5. A trace input device according to claim 4, wherein the first and second kinds of traces differ from each other in color of the trace and/or display speed thereof.

6. A trace input device according to claim 1, wherein the first and second kinds of traces differ in width from each other.

7. A trace input device with a remaining power informing function, comprising:

a trace input device for entering trace information;

display means for displaying the trace information entered by said trace input device;

power supply means for supplying electric power to said trace input device;

detection means for detecting a remaining power of said power supply means; and control means for changing, based on the remaining power detected by said detection means, a display form of the trace information displayed on said display means between a first display form and a second display form, said control means changes the display form by causing the trace information to flash in the first display form and by causing the trace information not to flash in the second display form.

8. A trace input method having a remaining battery power informing function, comprising steps of:

detecting a remaining power of a battery; and changing, based on the remaining power, a display form of trace information on a display device between a first kind of trace and a second kind of trace;

wherein said first and second kinds of traces are different from each other.

9. A trace input method according to claim 8, wherein the first and second kind of traces differ in color from each other.

10. A trace input method according to claim 9, wherein said first kind of trace color is black and said second kind of trace color is red.

11. A trace input method according to claim 8, wherein the first and second kinds of traces differ in width from each other.

12. A computer-readable memory medium storing computer-executable process steps to provide a trace input system having a remaining battery power informing function, the steps comprising:

a detecting step to detect a remaining power of a battery; and a changing step to change, according to the remaining power, trace on a display device between a first kind of trace and a second kind of trace;

wherein said first and second kinds of traces are different from each other.

13. A computer-readable memory medium storing computer-executable process steps according to claim 12, wherein the first and second kind of traces differ in color from each other.

14. A computer-readable memory medium storing computer-executable process steps according to claim 13, wherein said first kind of trace color is black and said second kind of trace color is red.

15. A computer-readable memory medium storing computer-executable process steps according to claim 12, wherein the first kind of trace is displayed with a first color when the remaining power of said battery exceeds a first value, wherein the second kind of trace is displayed with a second color when the remaining power is less than said first value but exceeds a second value.

16. A computer-readable memory medium storing computer-executable process steps according to claim 15, wherein said first color is black, and said second color is blue.

17. A computer-readable memory medium storing computer-executable process steps according to claim 12, wherein the first and second kinds of traces differ in width from each other.

* * * * *

UNITED STATES PATENT AND TRADEMARK OFFICE
CERTIFICATE OF CORRECTION

PATENT NO.  : 5,809,310

DATED       : September 15, 1998

INVENTORS   : Ryoji Fukuda, et al.

It is certified that error appears in the above-identified patent and that said Letters Patent is hereby corrected as shown below:

COLUMN 3

Line 45, "he" should read --the--; and

COLUMN 5

Line 37, "may" should read --may be--.

COLUMN 6

Line 59, "kind" should read --kinds--.

Signed and Sealed this

Thirteenth Day of July, 1999

Attest:

Q. TODD DICKINSON

Attesting Officer

Acting Commissioner of Patents and Trademarks